(12) United States Patent
Zaugg (10) Patent No.: US 8,923,097 B2
(45) Date of Patent: Dec. 30, 2014

(54) BACKLASH TAKE-UP WHEEL

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 13/921,609

(22) Filed: Jun. 19, 2013

(65) Prior Publication Data

US 2013/0340552 A1 Dec. 26, 2013

(30) Foreign Application Priority Data

Jun. 20, 2012 (EP) .................................... 12172743

(51) Int. Cl.
| | | |
|---|---|---|
| *G04B 19/02* | (2006.01) | |
| *F16H 55/14* | (2006.01) | |
| *G04B 35/00* | (2006.01) | |
| *F16H 55/18* | (2006.01) | |
| *G04B 13/02* | (2006.01) | |

(52) U.S. Cl.
CPC ................ *F16H 55/14* (2013.01); *G04B 35/00* (2013.01); *F16H 55/18* (2013.01); *G04B 13/027* (2013.01)
USPC ........................................... 368/220; 74/440

(58) Field of Classification Search
USPC ............. 368/139, 140–144, 220; 74/409, 440
See application file for complete search history.

(56) References Cited

U.S. PATENT DOCUMENTS

| | | | | |
|---|---|---|---|---|
| 1,772,986 A | * | 8/1930 | Dunham .......................... | 74/461 |
| 3,887,979 A | * | 6/1975 | Kamiya ...................... | 29/893.32 |
| 7,258,037 B2 | * | 8/2007 | Wiederrecht .................... | 74/461 |
| 7,633,837 B2 | * | 12/2009 | Daout ............................ | 368/220 |
| 7,969,825 B2 | * | 6/2011 | Daout ............................ | 368/220 |
| 8,011,267 B2 | * | 9/2011 | Scheufele ....................... | 74/461 |
| 8,468,904 B2 | * | 6/2013 | Nowicki ......................... | 74/461 |
| 2008/0307915 A1 | | 12/2008 | Scheufele | |
| 2011/0079098 A1 | | 4/2011 | Nowicki | |

FOREIGN PATENT DOCUMENTS

| | | |
|---|---|---|
| DE | 397646 C | 6/1924 |
| EP | 2 003 522 A1 | 12/2008 |
| FR | 699 318 A | 2/1931 |
| WO | WO 2009/114477 A2 | 9/2009 |
| WO | WO 2012/037593 A2 | 3/2012 |

OTHER PUBLICATIONS

European Search Report issued Dec. 17, 2012 in Patent Application No. 12 17 2743 with English language translation.

\* cited by examiner

*Primary Examiner* — Sean Kayes
(74) *Attorney, Agent, or Firm* — Oblon, Spivak, McClelland, Maier & Neustadt, L.L.P.

(57) ABSTRACT

Backlash take-up timepiece wheel (10), for meshing with a second toothing (21) formed of second teeth (23) of given width (24) arranged consecutively with a second constant pitch (P2) on a second pitch diameter (22) of an opposing mobile component. This backlash take-up wheel (10) comprises, arranged to mesh with this second toothing (21), a first toothing (11) on a first pitch circle (12) comprising a series of identical pairs (2) of teeth arranged consecutively with a first constant pitch (P1) on the first pitch circle (12). Each such pair (2) comprises, on either side of a radial axis (3), a first flexible tooth (4) and a second tooth (5).

Each second tooth (5) is a flexible tooth, and the distances (91, 92) measured on the first pitch circle (12) between a successive first tooth (4) and second tooth (5) are different in pairs.

15 Claims, 6 Drawing Sheets

BACKLASH TAKE-UP WHEEL

This application claims priority from European Patent Application No. 12172743.2 filed Jun. 20, 2012, the entire disclosure of which is incorporated herein by reference.

FIELD OF THE INVENTION

The invention concerns a backlash take-up timepiece wheel, for meshing with a second toothing formed of second teeth of given width arranged consecutively with a second constant pitch on a second pitch diameter of an opposing mobile component, said wheel including, arranged to mesh with said second toothing, a first toothing on a first pitch circle comprising a series of identical pairs of teeth arranged consecutively with a first constant pitch on said first pitch circle, each said pair comprising, on either side of a radial axis, a first flexible tooth and a second tooth.

The invention further concerns a timepiece gear train comprising at least one said first backlash take-up timepiece wheel, and at least one second mobile component comprising one said second toothing formed of said second teeth of said given width, arranged consecutively with a second constant pitch on a second pitch diameter.

The invention also concerns a timepiece movement including at least one gear train of this type.

The invention also concerns a timepiece including at least one movement of this type, and/or at least one gear train of this type.

The invention concerns the field of timepiece mechanisms comprising transmission means using gear trains.

BACKGROUND OF THE INVENTION

The quest for minimum backlash or backlash take-up in gearing teeth is a constant preoccupation in horology. The difficulty lies in the inevitable variations in distance between centres, due in particular to operating backlash in the pivots. Flexible toothings may be used to compensate for these variations in distance between centres; however their design is complex, due to their energy consumption and thus their impact on the overall efficiency of the gear train. An example is given by EP Patent No 2003522 in the name of Chopard Manufacture SA, which discloses a toothed, backlash take-up wheel with alternate rigid teeth and flexible teeth. This wheel cooperates with a drive wheel having rigid teeth, the rigid drive tooth is clamped between the rigid tooth and the elastic tooth of the driven wheel, so as to take-up the gear backlash via permanent contact between the rigid tooth of the driving wheel and the meshing flank of the driven wheel.

This geometry is preferably devised for one direction of rotation, and is ill-suited to a change of gearing direction. Moreover, with use, known flexible wheels are known to be very sensitive to wear.

WO Patent Application No. 2012/037593 A2 in the name of Miba Sineter Austria GmbH discloses another wheel with a differential arrangement of teeth in the direction of the thickness of the wheel plate. This wheel includes several materials of different elasticity.

The problem is therefore to take up play and prevent any display problems when there is a change of direction, for example during time-setting.

SUMMARY OF THE INVENTION

The invention proposes to define a gear train whose gearing has no backlash, regardless of the direction of rotation, with minimum torque consumption, and with the least possible wear during use.

The invention therefore concerns a backlash take-up timepiece wheel, for meshing with a second toothing formed of second teeth of given width arranged consecutively with a second constant pitch on a second pitch diameter of an opposing mobile component, said backlash take-up wheel comprising, arranged to mesh with said second toothing, a first toothing on a first pitch circle comprising a series of identical pairs of teeth arranged consecutively with a first constant pitch on said first pitch circle, each said pair comprising, on either side of a radial axis, a first flexible tooth and a second tooth, characterized in that the pitch thereof varies between two successive teeth, between a smaller pitch which is smaller than the theoretical pitch for meshing with a given opposing mobile component, and a larger pitch which is larger than said theoretic pitch, the total of said smaller pitch and said larger pitch being equal to twice said theoretical pitch, and in that each said tooth is placed on a flexible arm, attached to a hub of said wheel, in that each said second tooth is a flexible tooth, in that a first distance is measured on said first pitch circle between said first tooth and said second tooth of the same said pair, and a second distance is measured on said first pitch circle between one said first tooth and one said second tooth which are adjacent but appertain to different consecutive pairs, and in that said first distance is different from said second distance.

According to another feature of the invention, each said first tooth and each said second tooth comprise, on either side of a radial axis, two lateral stop surfaces respectively facing towards said two second adjacent teeth and towards the two said first adjacent teeth, and, in the unrestrained state, the third distance between two said lateral stop surfaces facing two said consecutive teeth is constant.

The invention further concerns a timepiece wheel comprising at least a first backlash take-up timepiece wheel, and at least one second mobile component comprising one said second toothing formed of said second teeth of said given width arranged consecutively with a second constant pitch on a second pitch diameter, characterized in that, in any meshing position of said first wheel and of said second mobile component, at least one said second tooth is clamped by one said first tooth and one said second tooth of one same said pair separated from each other, in the unrestrained state, by said first distance.

According to a feature of the invention, in the unrestrained state, a first distance, measured on said first pitch circle between said first tooth and said second tooth of one same said pair, is the smallest distance between two said successive flexible teeth, and is substantially less than said given width, measured on said second pitch circle, of said second teeth forming said second toothing.

According to another feature of the invention, in the unrestrained state, a second distance, measured on said first pitch circle between one said first tooth and one said second tooth which are adjacent but appertain to different said pairs, is the greatest distance between two said successive flexible teeth and is substantially less than the sum of said second pitch of said second toothing and said given width, measured on said second pitch circle, of said second teeth forming said second toothing.

The invention also concerns a timepiece movement comprising at least one gear train of this type, characterized in that said second mobile component drives and said first backlash take-up wheel set is driven, and in that said at least one gear train is reversible and behaves identically in both directions of pivoting.

The invention further concerns a timepiece including at least one movement of this type and/or at least one gear train of this type, characterized in that said at least one gear train is reversible and behaves identically in both directions of pivoting.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

The invention concerns the field of timepiece mechanisms comprising transmission means using gear trains.

The term "mobile component" hereafter concerns any component which is capable of moving or shifting or rotating, particularly a wheel.

The invention proposes to define a gear train whose gearing has no backlash, regardless of the direction of rotation, with minimum torque consumption, and with the least possible wear during use.

The principle of the invention is to use a particular toothing for one of the gear train wheels, hereinafter referred to as the first "backlash take-up wheel" 10. The pitch of this toothing varies between two successive teeth: being once smaller than the theoretical pitch, for gearing with a given opposing mobile component, and once larger, the total of the smaller pitch and larger pitch being equal to two times the theoretical pitch. The smaller pitch is smaller than the width of one tooth of the opposing mobile component on the pitch diameter, and the larger pitch is larger than said width. The Figures show a preferred realisation in which such opposing mobile component 20 is a wheel.

Each tooth is preferably placed on a flexible arm, attached to a hub of the wheel.

This configuration allows two teeth having the smaller pitch to clamp an opposite tooth of an opposing mobile component, and thus removes any backlash.

At the next step, during the change to the largest pitch, clamping occurs on the opposite external teeth, as will be explained in detail below.

Thus, the invention concerns a timepiece wheel 10 with backlash take-up. This first backlash take-up wheel 10 is arranged to mesh with a second toothing 21 formed of second teeth 23 of given width 24 arranged consecutively with a second constant pitch P2 on a second pitch diameter 22 of an opposing mobile component 20, which is a wheel in the particular realisation of the drawings.

Wheel 10 also includes a first toothing 11 on a first pitch circle 12, arranged to mesh with a second toothing 21 of this type. This first toothing 11 comprises a series of pairs 2 of teeth. These pairs 2 are identical to each other and arranged consecutively with a first constant pitch P1 on first pitch circle 12. Each pair 2 comprises, on either side of a radial axis 3 which separates them, a first flexible tooth 4 and a second tooth 5.

According to the invention, the tooth pitch of wheel 10 varies between a successive first tooth 4 and second tooth 5, between a smaller pitch which is smaller than the theoretical pitch for gearing with a given opposing mobile component 20, and a larger pitch which is larger than the theoretical pitch, the total of the smaller pitch and the larger pitch being equal to two times the theoretical pitch.

Each first tooth 4 and each second tooth 5 is placed on a flexible arm 43, 45, attached to a hub 13 of wheel 10. Each second tooth 5 is a flexible tooth. A first distance 91 is measured on first pitch circle 12 between the first tooth 4 and second tooth 5 of the same pair 2. A second distance 92 is measured on the first pitch circle 12 between a first tooth 4 and a second tooth 5 which are adjacent but appertain to different consecutive pairs 2. According to the invention, this first distance 91 is different from second distance 92.

In a preferred embodiment, for use in either direction of pivoting, each pair 2 is symmetrical to its radial axis 3 and first tooth 4 mirrors second tooth 5.

According to the invention, each second tooth 5 is a flexible tooth, and distances 91, 92 measured on first pitch circle 12 between a successive first tooth 4 and second tooth 5 are different in pairs.

Figure 1:
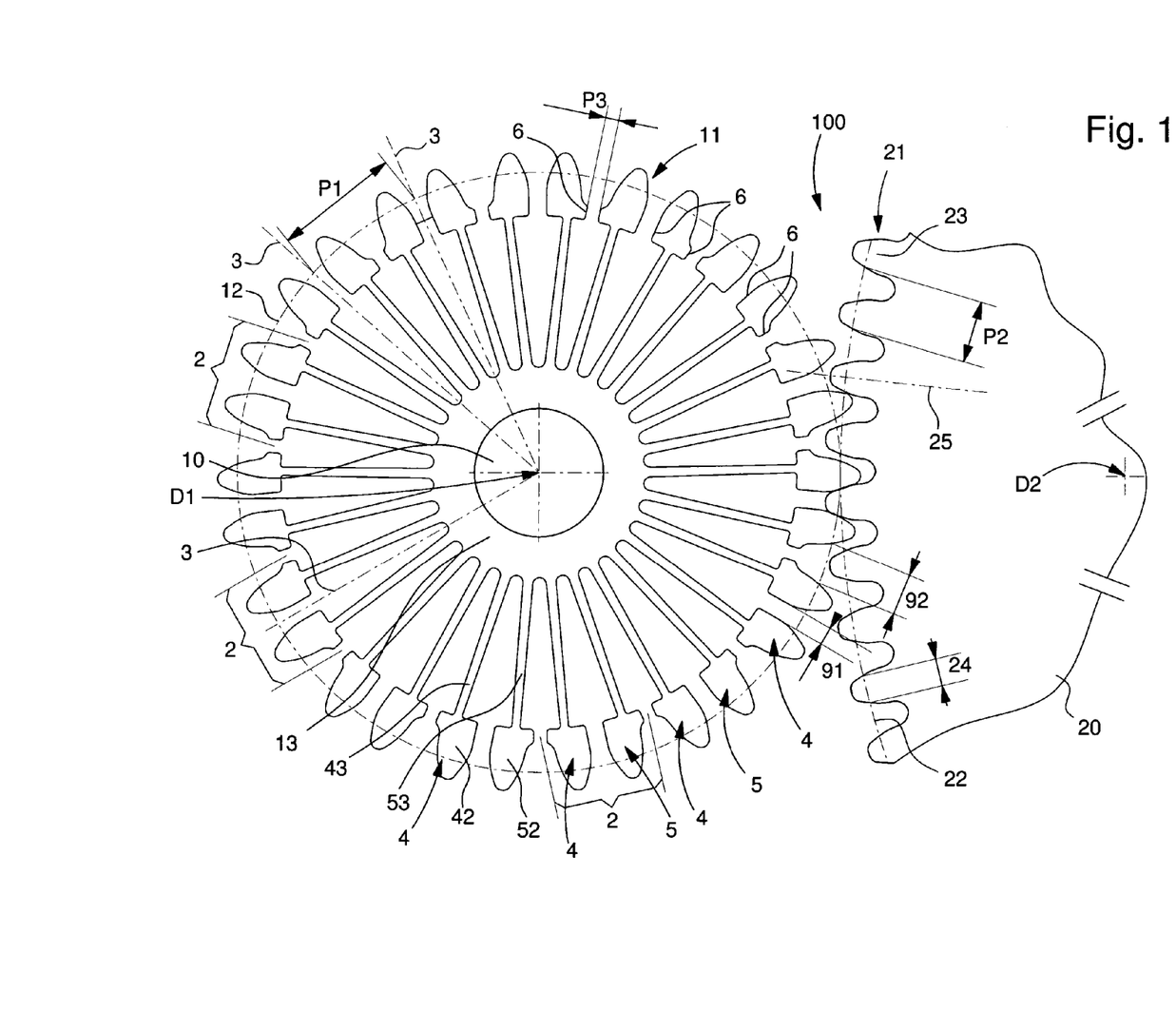
FIG. 1 shows a schematic, plan view of one portion of a gear train of the invention, comprising a first backlash take-up wheel according to the invention with a series of identical pairs of teeth; the pairs are equidistant and each pair comprises a first flexible tooth and a second tooth according to the invention, in a first meshing position.
Figure 2:
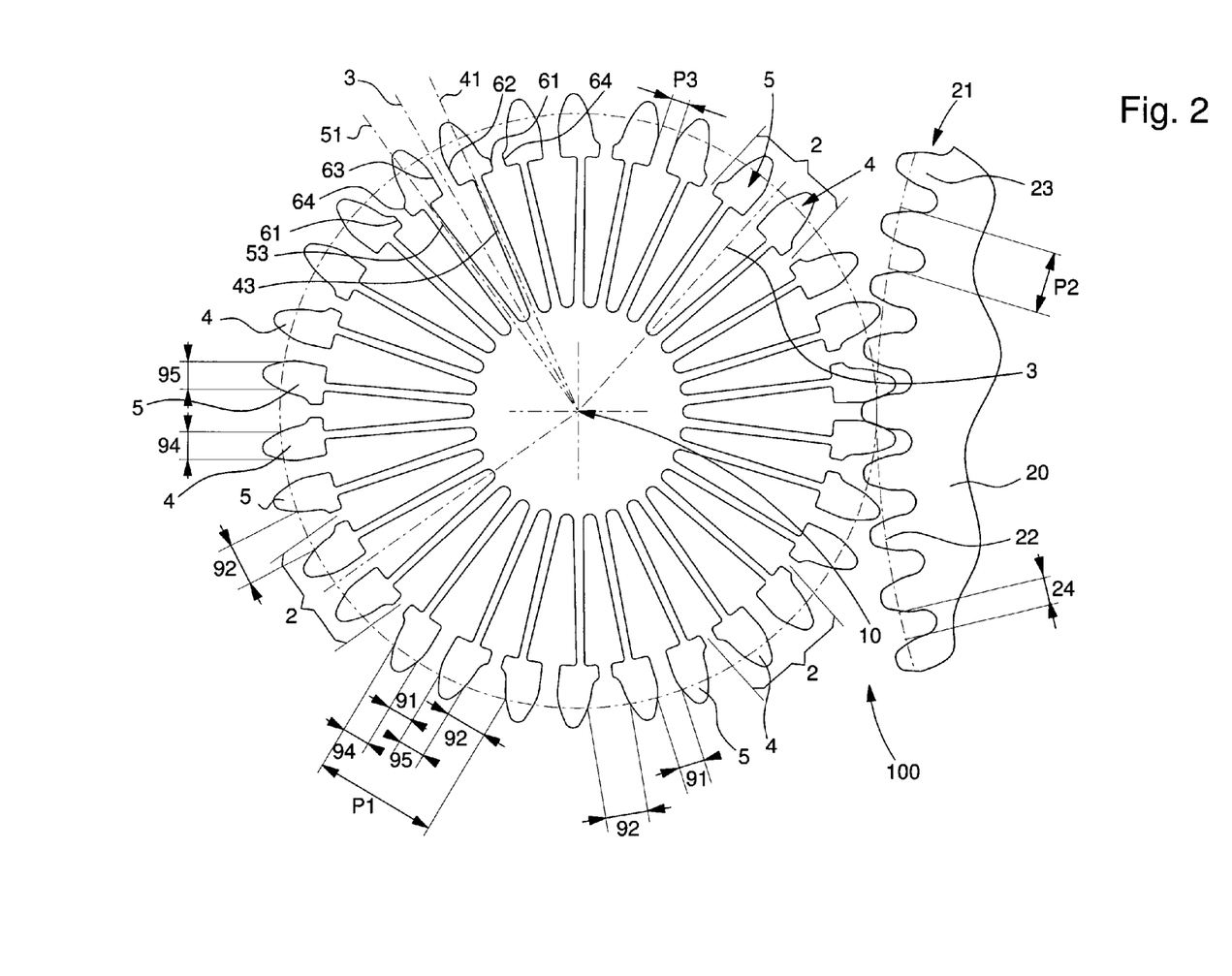
FIG. 2 shows the mechanism of FIG. 1, after pivoting the two wheels through a slight angle.

As shown in FIGS. 1 and 2, in the unrestrained state, a first distance 91 measured on first pitch circle 12 between the first tooth 4 and second tooth 5 of the same pair 2 is the smallest distance between two successive flexible teeth 4 and 5, and is substantially less than the given width 24, measured on the second pitch circle 22, of second teeth 23 forming second toothing 21.

Likewise, in the unrestrained state, a second distance 92, measured on first pitch circle 12 between a first tooth 4 and a second tooth 5 which are adjacent but appertain to different consecutive pairs 2, is the largest distance between two successive flexible teeth 4 and 5, and is substantially less than the sum of second pitch P2 of second toothing 21 and given width 24, measured on second pitch circle 22, of second teeth 23 forming second toothing 21.

It is clear that pitch P1 between two consecutive pairs 2 is equal to the sum of the first distance 91, second distance 92 and widths 94 and 95 of teeth 4 and 5 on pitch diameter 12.

Preferably, each first tooth 4 and each second tooth 5 comprise, on either side of a radial axis, respectively 41, 51, two lateral stop surfaces 6, respectively facing towards two adjacent second teeth 5 and towards two first adjacent teeth 4.

In the unrestrained state, the third distance P3 is constant between two lateral stop faces 6 facing two consecutive teeth 4, 5.

The function of these stop surfaces 6 is to limit the effect of any excessive torque applied by the drive wheel (in this case a second mobile component 20 which is a wheel carrying second toothing 21 in the case of gear train 100 illustrated in the Figures) to first wheel 10 according to the invention. In a particular, non-limiting embodiment, in the unrestrained state, the backlash between two adjacent stop surfaces 6 is close to 0.04 mm.

FIG. 2 shows these stop surfaces, respectively 61 and 62 on first tooth 4, on either side of its radial axis 41, and 63 and 64 on second tooth 5, on either side of its radial axis 51. In the event of a shock, surfaces 61 and 63 of the same pair 2 support each other. Likewise, the adjacent surface 64 of a pair 2 and surface 61 of the immediately closest pair 2 support each other.

Figure 8:
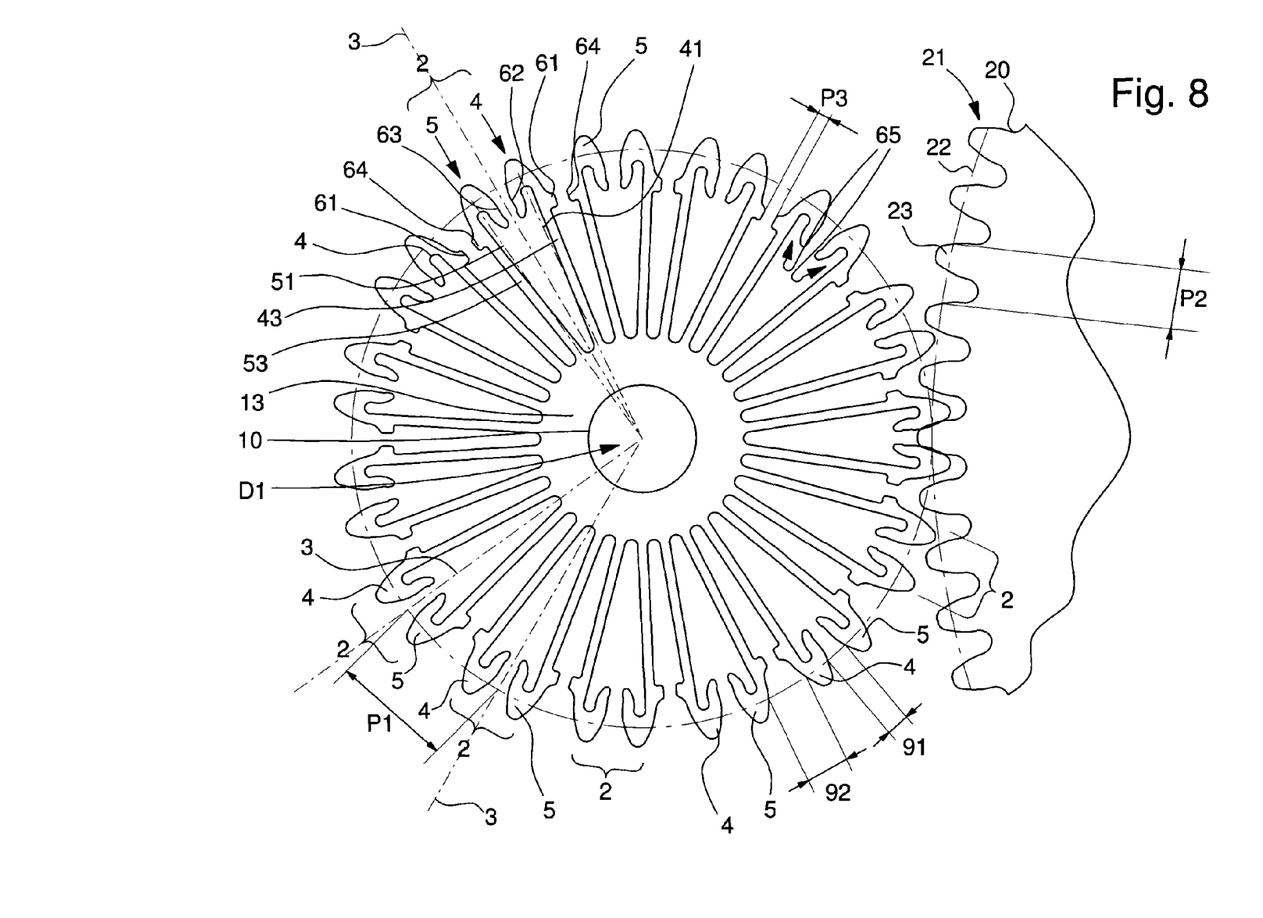
FIG. 8 shows, similarly, another variant of the invention with different shaped teeth.

FIG. 8 illustrates another variant of the invention where first tooth 4 and second tooth 5 are not rigid, but flexible, particularly formed by an elastic loop 65, which improves shock absorption.

In a particular version, illustrated in FIGS. 1 to 7, each first tooth 4 includes a head 42, which is preferably rigid, attached to an axial hub 13 of wheel 10 by a first flexible arm 43. Likewise, each second tooth 5 has a preferably rigid head 52, attached to an axial hub 13 of wheel 10 by a second flexible arm 53. If a long length is selected for each flexible arm 43, 45, this enables the very low forces present to be more easily controlled than a beam formed in the actual tooth. Thus, preferably, the first teeth 4 and second teeth 5 overhang relative to an axial hub 13 with a radial projection of between 0.50 and 0.95 times the value of the maximum radius of wheel 10.

The low force allows wheel 10 to be used for low torque functions at high rotational speeds, without interference or wear.

Advantageously, for proper reverse operation, wheel 10 is symmetrical relative to a plane passing through its pivot axis D1 and through a radial axis 3 of a pair 2 comprised therein.

Figure 3:
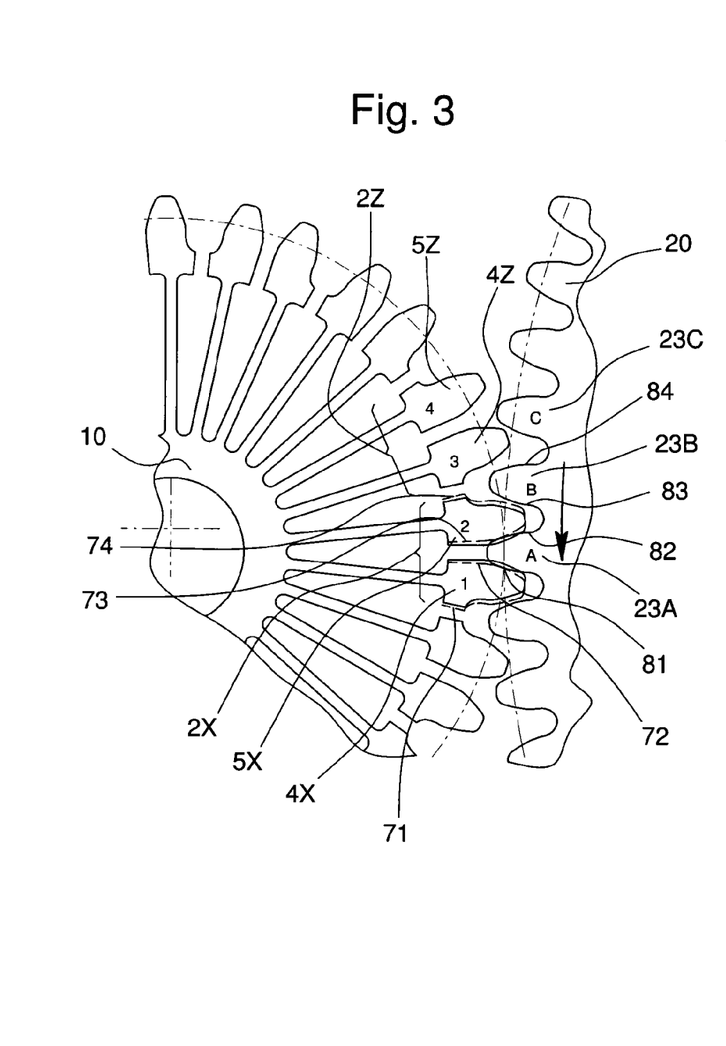
FIGS. 3 to 7 show a pivoting sequence of the gear train of FIG. 1, from a first reference position of first backlash take-up wheel called 0°, through pivoting positions of backlash take-up wheel every 6°: 6° in FIG. 4, 12° in FIG. 5, 18° in FIG. 6, 24° in FIG. 7.
Figure 4:
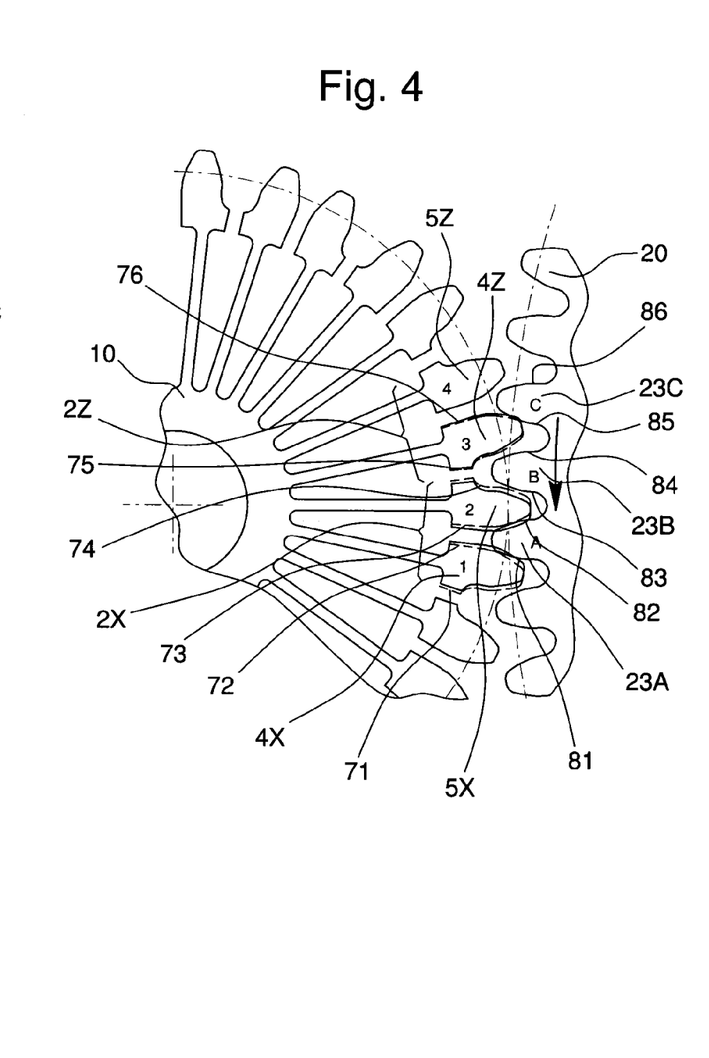
Figure 5:
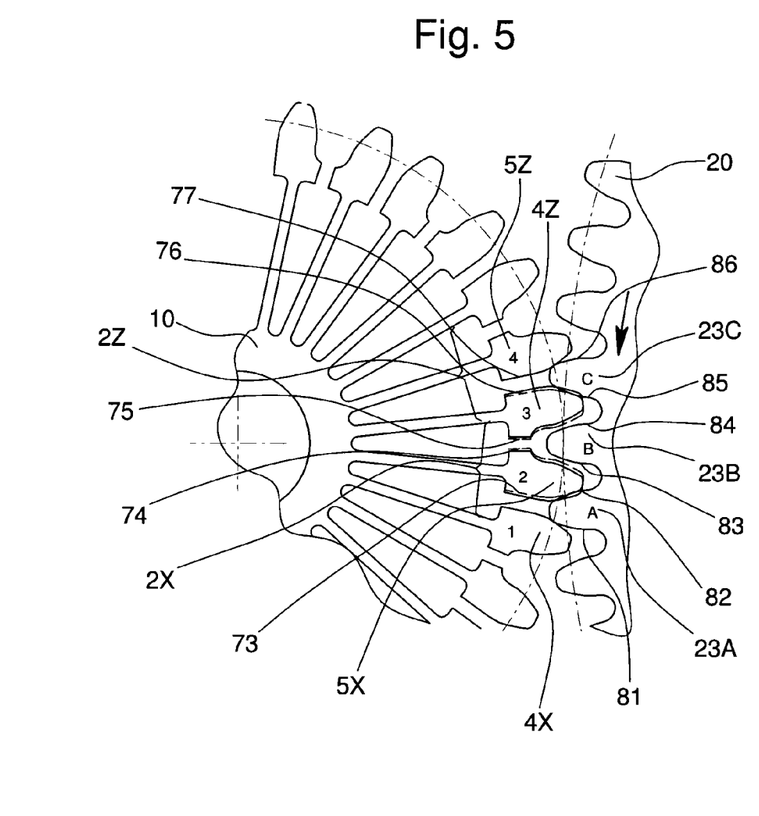
Figure 6:
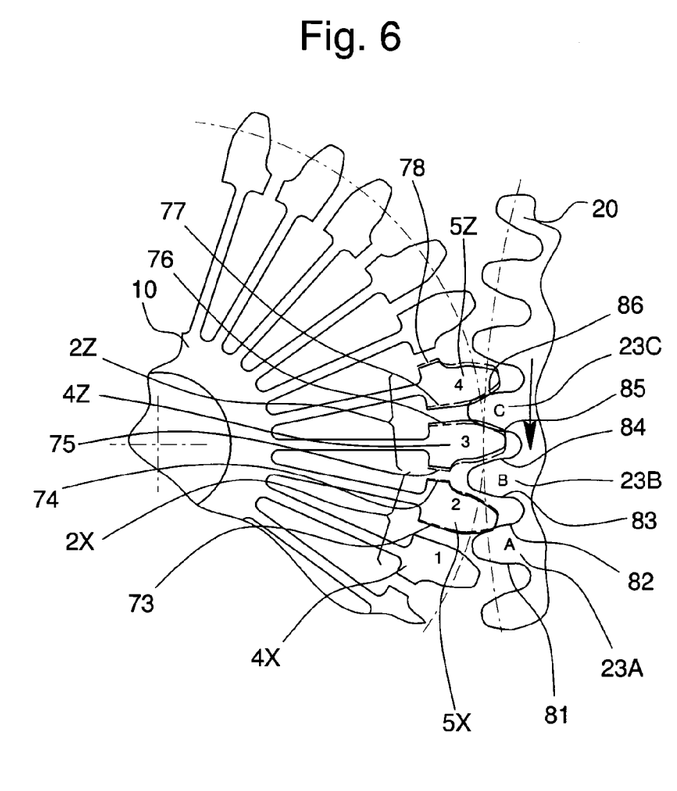
Figures 7, 9:
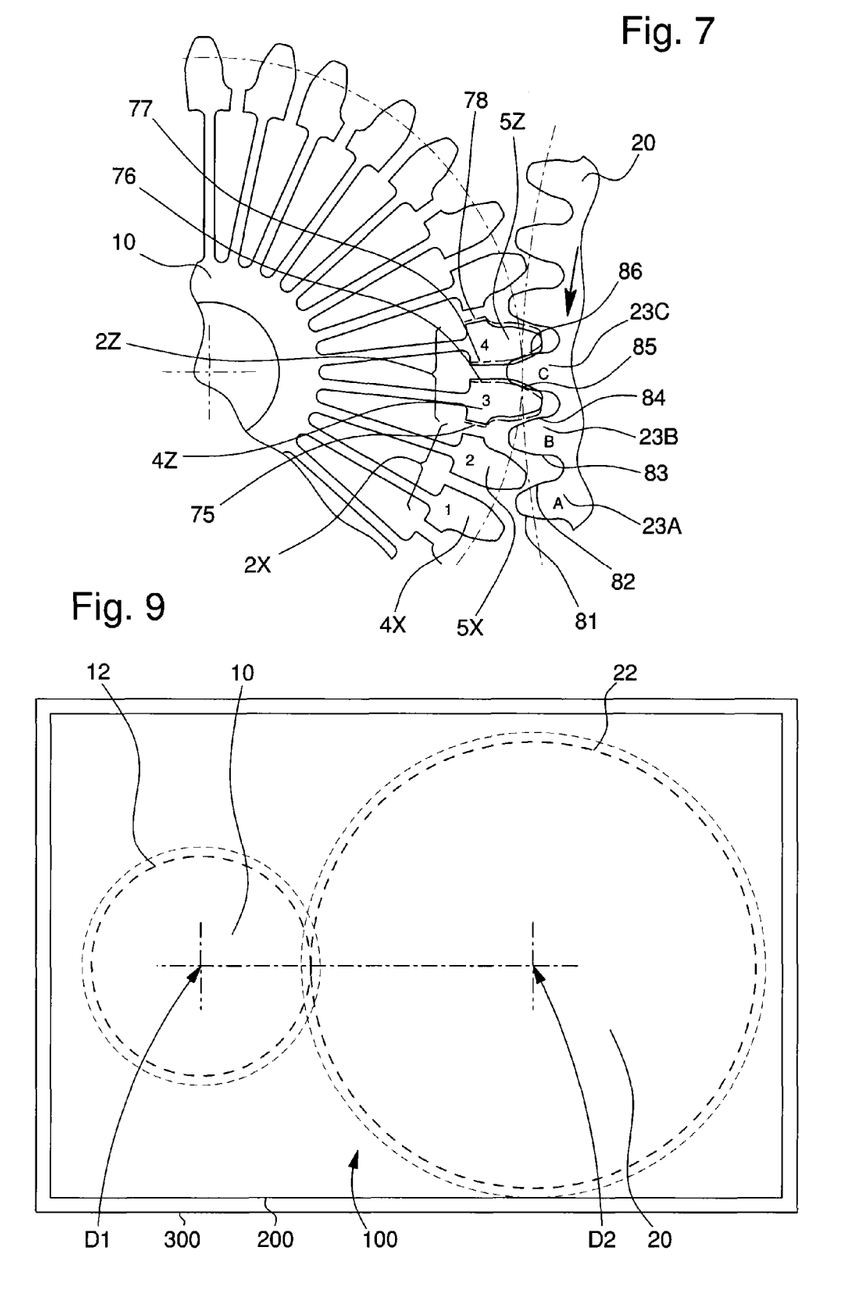
FIG. 9 shows block diagrams of a timepiece comprising a movement which includes a gear train according to the invention.

FIGS. 3 to 7 show a pivoting sequence of the gear train of FIG. 1, from a first reference position of first wheel 10 called "0°", through pivoting positions of wheel 10 every 6°: 6° in FIG. 4, 12° in FIG. 5, 18° in FIG. 6, 24° in FIG. 7. The positions of the various teeth in the unrestrained state are shown in a fine line, and the deformed positions resulting from forces applied are in dotted lines. In this example, a second mobile component 20, comprising the second toothing 21, drives and pivots anti-clockwise.

In the 0° position in FIG. 3, one tooth 23A of second mobile component 20 presses, via a lower lateral surface 81, on an upper lateral surface 72 of first tooth 4X of first wheel 10, and pushes tooth 4X and tends to pivot first wheel 10. Tooth 23A is clamped by teeth 4X and 5X. The second upper lateral surface 82 of tooth 23A is in contact with second tooth 5X, and deforms tooth 5X, tending to push it back in the opposite direction to that in which surface 81 is pressing on tooth 4X. The elastic return torque of tooth 5X causes it to push onto tooth 23A and to accompany the thrust force thereof on tooth 4X to rotate wheel 10.

In the 6° position in FIG. 4, tooth 23A is still in clamped contact with teeth 4X and 5X. The next tooth 23B is unrestrained. Tooth 23C starts to press, via its bottom surface 85, on top surface 76 of tooth 4Z, tending to pivot wheel 10.

In the 12° position in FIG. 5, tooth 23A is still in contact with tooth 4X, but is not exerting any pressure thereon. Tooth 23A is still pressing on bottom surface 73 of tooth 5X. The next tooth 23B is unrestrained. Tooth 23C presses, via its bottom surface 85, on the top surface 76 of tooth 4Z, to pivot wheel 10.

In the 18° position in FIG. 6, tooth 23A is no longer in contact with tooth 4X, and is still pressing on the bottom surface 73 of tooth 5X. The next tooth 23B is unrestrained. Tooth 23C is clamped by teeth 4Z and 5Z. Tooth 23C presses, via its bottom surface 85, on the top surface 76 of tooth 4Z, to pivot wheel 10. The second upper lateral surface 86 of tooth 23C is in contact with second tooth 5Z, and deforms tooth 5Z, tending to push it back in the opposite direction to that in which surface 85 is pressing on tooth 4Z. The elastic return torque of tooth 5Z causes it to press onto tooth 23C and to accompany the thrust force thereof on tooth 4Z to rotate wheel 10.

In the 24° position in FIG. 7, teeth 23A and 23B are released. Only tooth 23C is still clamped in a similar manner to the position in FIG. 6.

The invention also concerns a timepiece gear train 100 comprising at least a first wheel 10 of this type, and at least a second mobile component 20 comprising a second toothing 21 formed of second teeth 23 of given width 24 arranged consecutively with a second constant pitch P2 on a pitch diameter 22.

According to the invention, in any gearing position of first wheel 10 and of second mobile component 20, at least one second tooth 23 is clamped by a first tooth 4 and a second tooth 5 of the same pair 2, separated from each other, in the unrestrained state, by first distance 91.

In a preferred variant illustrated in FIGS. 3 to 7, according to the angular meshing positions between first wheel 10 and second mobile component 20, either a single second tooth 23 is clamped by a pair 2, as seen in FIGS. 3, 4, 6 and 7, or two second teeth 23, separated by a third second tooth 23, are clamped by two successive pairs 2 as seen in FIG. 5.

In a particular variant, illustrated in FIGS. 3 to 7, over a complete revolution of second mobile component 20, only one out of two second teeth 23 is alternately in drive contact with one of teeth 4, 5 of the first toothing 11 of first wheel 10. Thus, one out of two teeth of second mobile component 20 is clamped by the flexible teeth, which removes any backlash. It is possible, in a particular variant (not illustrated) to remove one out of two teeth, when there is an integer number of teeth 23 of second toothing 21 of second mobile component 20. However, the embodiment with one continuous toothing illustrated in the Figures, is less expensive and remains compatible with existing wheels. It offers improved facility of assembly, since the second mobile component 20 may be in placed in any angular position relative to the first wheel 10. When there is a non-integer number of teeth of second mobile component 20, all the teeth are stressed over two revolutions and this configuration is thus a favourable fact in terms of reducing wear.

Preferably, second toothing 21 of second mobile component 20 has rigid second teeth 23.

Preferably, for reverse operation, the second toothing 21 includes teeth 23 which are each symmetrical relative to a radial axis 25 passing through pivot axis D2 of second mobile component 20, and said second mobile component 20 is symmetrical relative to a plane passing through its pivot axis D2 and through a radial axis 25 of a second tooth 23 comprised in second toothing 21.

The invention also concerns a timepiece movement 200 including at least one gear train 100 of this type. Preferably, the second mobile component 20 drives and first wheel 10 is driven, and this at least one gear train 100 is reversible and behaves in an identical manner in both directions of pivoting.

The invention also concerns a timepiece 300 incorporating at least one such movement 200, and/or at least one such gear train 100. Preferably, this at least one gear train 100 is reversible and behaves in an identical manner in both directions of pivoting.

The invention uses low pressure forces on the teeth to cancel out any gear backlash.

The invention allows very low gearing torques, for example for applications for rotating seconds devices or for meshing chronograph seconds.

Compared to known mechanisms, the invention reduces variations in torque due to friction, and decreases wear due to friction. Manufacture is facilitated, and the backlash take-up wheel of the invention is easy to manufacture in micro-machinable material, silicon, or NiP or similar, using a LIGA or similar method. Assembly is easy and has no risk of error.

The embodiment of the invention also allows stresses to be distributed over several teeth when there is significant disturbance torque.

The invention therefore accomplishes the object of achieving gearing without any backlash in both directions of operation; and of low torque consumption, which means it can be used on the seconds display of small or flat movements; and of reduced wear of the teeth. Any floating of hands is eliminated, in particular where a large central seconds hand having a strong unbalance is used.

What is claimed is:

1. A backlash take-up timepiece wheel, for meshing with mobile component toothing formed of external teeth of a given width arranged consecutively with a constant pitch on a pitch circle of an opposing mobile component, said backlash take-up wheel comprising:

a backlash take-up wheel toothing arranged on a pitch circle of the backlash take-up wheel to mesh with said mobile component toothing, the backlash take-up wheel toothing including a series of identical pairs of teeth arranged consecutively with a constant backlash take-up wheel pitch on said pitch circle of the backlash take-up wheel, each pair including, on either side of a first radial axis, a first flexible tooth and a second flexible tooth, wherein the pitch thereof varies between two successive teeth, between a smaller pitch which is smaller than a theoretical pitch for meshing with a given opposing mobile component, and a larger pitch which is larger than said theoretic pitch, the total of said smaller pitch and said larger pitch being equal to two times said theoretical pitch, and wherein each first flexible tooth is placed on a first flexible arm and each second flexible tooth is placed on a second flexible arm, said first flexible arm and said second flexible arm being attached to a hub of said backlash take-up wheel, wherein a first distance is measured on said pitch circle of the backlash take-up wheel between said first flexible tooth and said second tooth of the same said pair, and a second distance is measured on said pitch circle of the backlash take-up wheel between one first tooth and one second tooth of the backlash take-up wheel toothing which are adjacent but appertain to different consecutive pairs of the series of identical pairs of teeth, and wherein said first distance is different from said second distance.

2. The backlash take-up wheel according to claim 1, wherein, to allow use in either direction of pivoting, each pair in the series of identical pairs of teeth is symmetrical to the first radial axis of said pair and wherein said first flexible tooth is a mirror of said second flexible tooth.

3. The backlash take-up wheel according to claim 1, wherein each first flexible tooth and each second flexible tooth includes, on either side of a second radial axis, two lateral stop surfaces respectively facing towards said two second adjacent teeth and towards said two first adjacent teeth, and that, in an unrestrained state, a third distance between two of said lateral stop surfaces facing two of said consecutive teeth is constant.

4. The backlash take-up wheel according to claim 1, wherein each first flexible tooth has a rigid head, attached to an axial hub of said backlash take-up wheel by the first flexible arm.

5. The backlash take-up wheel according to claim 1, wherein each second flexible tooth has a rigid head, attached to an axial hub of said backlash take-up wheel by the second flexible arm.

6. The backlash take-up wheel according to claim 1, wherein said first teeth and second teeth overhang relative to an axial hub with a radial projection of between 0.50 and 0.95 times the value of a maximum radius of said backlash take-up wheel.

7. The backlash take-up wheel according to claim 1, wherein the wheel is symmetrical to a plane passing through the pivot axis thereof and through one said radial axis of one said pair comprised therein.

8. A timepiece gear train comprising at least a first backlash take-up wheel according to claim 1, and at least one mobile component comprising one of said mobile component toothing formed of said external teeth of said given width arranged consecutively with the constant pitch on the pitch circle of the mobile component, wherein, in any meshing position of said first backlash take-up wheel and of said mobile component, at least one external tooth of the mobile component is clamped by one first tooth and one second tooth of one pair in the series of identical pairs of teeth of the backlash take-up wheel, the one first tooth and the one second tooth separated from each other, in an unrestrained state, by said first distance.

9. The gear train according to claim 8, wherein, according to angular meshing positions of said first backlash take-up wheel and of said mobile component, either a single external tooth of the mobile component is clamped by a single pair in the series of identical pairs of teeth of the backlash take-up wheel, or two external teeth of the mobile component, separated by a third external tooth of the mobile component, are clamped by two successive pairs in the series of identical pairs of teeth of the backlash take-up wheel.

10. The gear train according to claim 8, wherein, over one complete revolution of said mobile component, only one out of two of said external teeth is in drive contact with one of said first and second flexible teeth of said backlash take-up wheel toothing of said first backlash take-up wheel.

11. The gear train according to claim 8, wherein said mobile component toothing of said mobile component has rigid external teeth.

12. The gear train according to claim 8, wherein said mobile component toothing includes said external teeth which are each symmetrical to a radial axis passing through a pivot axis of said mobile component, and said mobile component is symmetrical to a plane passing through the pivot axis thereof and through a radial axis of one external tooth of said mobile component toothing.

13. The gear train according to claim 8 wherein, in the unrestrained state, the first distance measured on said pitch circle of the backlash take-up wheel between said first flexible tooth and said flexible second tooth of the same said pair is the smallest distance between two successive flexible teeth and, and is substantially smaller than said given width, measured on said pitch circle of the mobile component, of said external teeth forming said mobile component toothing.

14. The gear train according to claim 13, wherein, in the unrestrained state, the second distance, measured on said pitch circle of the backlash take-up wheel between one first flexible tooth and one second flexible tooth of the backlash take-up wheel toothing which are adjacent but appertain to different pairs of the series of identical pairs of teeth, is the greatest distance between two successive first and second flexible teeth and is substantially smaller than a sum of said constant pitch of said mobile component toothing and said given width, measured on said pitch circle of the mobile component, of said external teeth forming said mobile component toothing.

15. A timepiece movement comprising at least one gear train according to claim 8, wherein said mobile component drives and said first backlash take-up wheel is driven, and wherein said at least one gear train is reversible and behaves identically in both directions of pivoting.

* * * * *